(12) United States Patent
Casey

(10) Patent No.: US 7,099,722 B2
(45) Date of Patent: Aug. 29, 2006

(54) WORK MACHINE ATTACHMENT CONTROL SYSTEM

(75) Inventor: Kent Allen Casey, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 111 days.

(21) Appl. No.: 10/925,971

(22) Filed: Aug. 26, 2004

(65) Prior Publication Data

US 2006/0047393 A1   Mar. 2, 2006

(51) Int. Cl.
  *G06F 19/00*   (2006.01)
  *G05B 15/00*   (2006.01)
  *A01B 67/00*   (2006.01)
  *A01B 63/00*   (2006.01)

(52) U.S. Cl. ............................ 700/85; 700/188; 701/58

(58) Field of Classification Search ................. 700/56, 700/61–65, 83–85, 186, 188, 275; 701/1, 701/2, 50–56, 58, 67, 68, 93–98; 463/36–38; 172/2, 3, 9, 136
See application file for complete search history.

(56) References Cited

U.S. PATENT DOCUMENTS

| | | | | |
|---|---|---|---|---|
| 4,625,281 | A | | 11/1986 | Deutsch ................. 701/101 |
| 4,900,252 | A | * | 2/1990 | Liefke et al. ................. 433/27 |
| 5,182,908 | A | * | 2/1993 | Devier et al. ................. 60/420 |
| 5,319,933 | A | * | 6/1994 | Omberg et al. ............... 60/426 |
| 5,590,731 | A | * | 1/1997 | Jacobson ..................... 701/50 |
| 5,692,376 | A | * | 12/1997 | Miki et al. .................... 60/328 |
| 6,061,617 | A | | 5/2000 | Berger et al. ................. 701/50 |
| 6,119,054 | A | * | 9/2000 | Miki et al. .................... 701/50 |
| 6,167,337 | A | * | 12/2000 | Haack et al. .................. 701/50 |
| 6,208,925 | B1 | | 3/2001 | Creger et al. ................. 701/51 |
| 6,234,254 | B1 | | 5/2001 | Dietz et al. ..................... 172/3 |
| 6,447,423 | B1 | | 9/2002 | Cannon et al. ............... 477/46 |
| 6,522,964 | B1 | * | 2/2003 | Miki et al. .................... 701/50 |
| 6,529,805 | B1 | | 3/2003 | Aldrich et al. ................. 701/1 |
| 6,542,789 | B1 | | 4/2003 | Ufheil ........................ 700/275 |
| 6,579,206 | B1 | | 6/2003 | Liu et al. ...................... 477/43 |
| 6,615,114 | B1 | * | 9/2003 | Skiba et al. ................ 700/275 |
| 6,615,581 | B1 | | 9/2003 | Kusuyama .................... 60/328 |
| 6,718,245 | B1 | * | 4/2004 | Watanabe et al. ............. 701/50 |
| 6,928,353 | B1 | * | 8/2005 | Finley et al. .................. 701/50 |
| 7,010,367 | B1 | * | 3/2006 | Koch et al. .................... 700/85 |
| 2003/0230447 | A1 | * | 12/2003 | Wulfert et al. .............. 180/329 |
| 2005/0246040 | A1 | * | 11/2005 | Horkavi et al. .............. 700/83 |
| 2006/0021819 | A1 | * | 2/2006 | Shearer et al. .............. 180/321 |

* cited by examiner

FOREIGN PATENT DOCUMENTS

EP      0 768 433 B1   6/2001

OTHER PUBLICATIONS

PCT International Publication No. WO 00/37744, published Jun. 29, 2000, Inventor—Ufheil, entitled Tool Recognition and Control System for a Work Machine.

*Primary Examiner*—Maria N. Von Buhr
(74) *Attorney, Agent, or Firm*—Finnegan,Henderson,Farabow,Garrett&Dunner LLP

(57) ABSTRACT

A control system is provided for a work machine having a plurality of removably attachable work tools. The control system has at least one operator input device that is configured to control a movement speed of the work machine. The control system also has a tool recognition device configured to generate a signal corresponding to each of the removably attachable work tools and a controller in communication with the at least one input device and the tool recognition device. The controller is configured to change a ratio of a work machine movement speed to actuation position of the input device in response to the signal.

37 Claims, 2 Drawing Sheets

WORK MACHINE ATTACHMENT CONTROL SYSTEM

TECHNICAL FIELD

The present disclosure relates generally to a work machine control system and, more particularly, to a work machine control system based on an attachment configuration.

BACKGROUND

Work machines such as integrated tool carriers, skid steer loaders, agricultural tractors, excavators, and other work machines have a variety of work tools that may be attachable to the work machine to perform different tasks. These work machines and work tools may be controlled through a control system having one or more operator input devices such as, for example, control levers, foot pedals, joysticks, and other devices known in the art.

Each work tool may require different control parameters for the operator input devices to accomplish the different tasks. For example, an operator of a tool carrier having a fork attachment may require precise control over tool movement speed or work machine travel speed during a stacking operation, while such precise control may not be required for the same tool carrier having a bucket attachment for performing earth moving operations. In addition, a work machine with no tool attached may require precise travel speed control at low travel speeds to facilitate a tool attachment procedure, but less precise travel speed control at higher speeds when traveling between jobsites or work tool storage locations.

One method to provide improved control over work machine or work tool movement based on an attachment configuration is described in U.S. Pat. No. 6,542,789 (the '789 patent) to Ufheil. The '789 patent teaches a tool recognition and control system for a work machine that automatically configures certain systems of a work machine based on a particular work tool attached to the work machine. In particular, the '789 patent teaches establishing a range of motion for a work tool, a steering gain associated with a drive control joystick, a maximum forward speed for the work machine, or an engine speed that corresponds to a particular work tool. These parameters may be automatically established through tool recognition routines or manually selected by an operator.

Although the tool recognition and control system of the '789 patent improves control of the work machine and work tool based on a particular attachment configuration, the tool recognition and control system has certain limitations. In particular, the tool recognition and control system of the '789 patent does not provide precise control over work machine travel speed and work tool movement speed, but rather only establishes boundary limits.

The disclosed work machine control system is directed to overcoming one or more of the problems set forth above.

SUMMARY OF THE INVENTION

In one aspect, the present disclosure is directed to a control system for a work machine that has a plurality of removably attachable work tools. The work machine control system includes at least one operator input device configured to control a movement speed of the work machine. The work machine control system also includes a tool recognition device configured to generate a signal corresponding to each of the removably attachable work tools and a controller in communication with the at least one input device and the tool recognition device. The controller is configured to change a ratio of a work machine movement speed to actuation position of the input device in response to the signal.

In another aspect, the present disclosure is directed to a method of controlling a work machine having a plurality of removably attachable work tools. The method includes receiving an input from an input device indicative of a desired movement speed of the work machine. The method further includes generating a signal with a tool recognition device indicative of which one of the plurality of removably attachable work tools are attached to the work machine. The method further includes changing a ratio of a work machine movement speed to actuation position of the input device in response to the signal.

DETAILED DESCRIPTION

Figure 1:
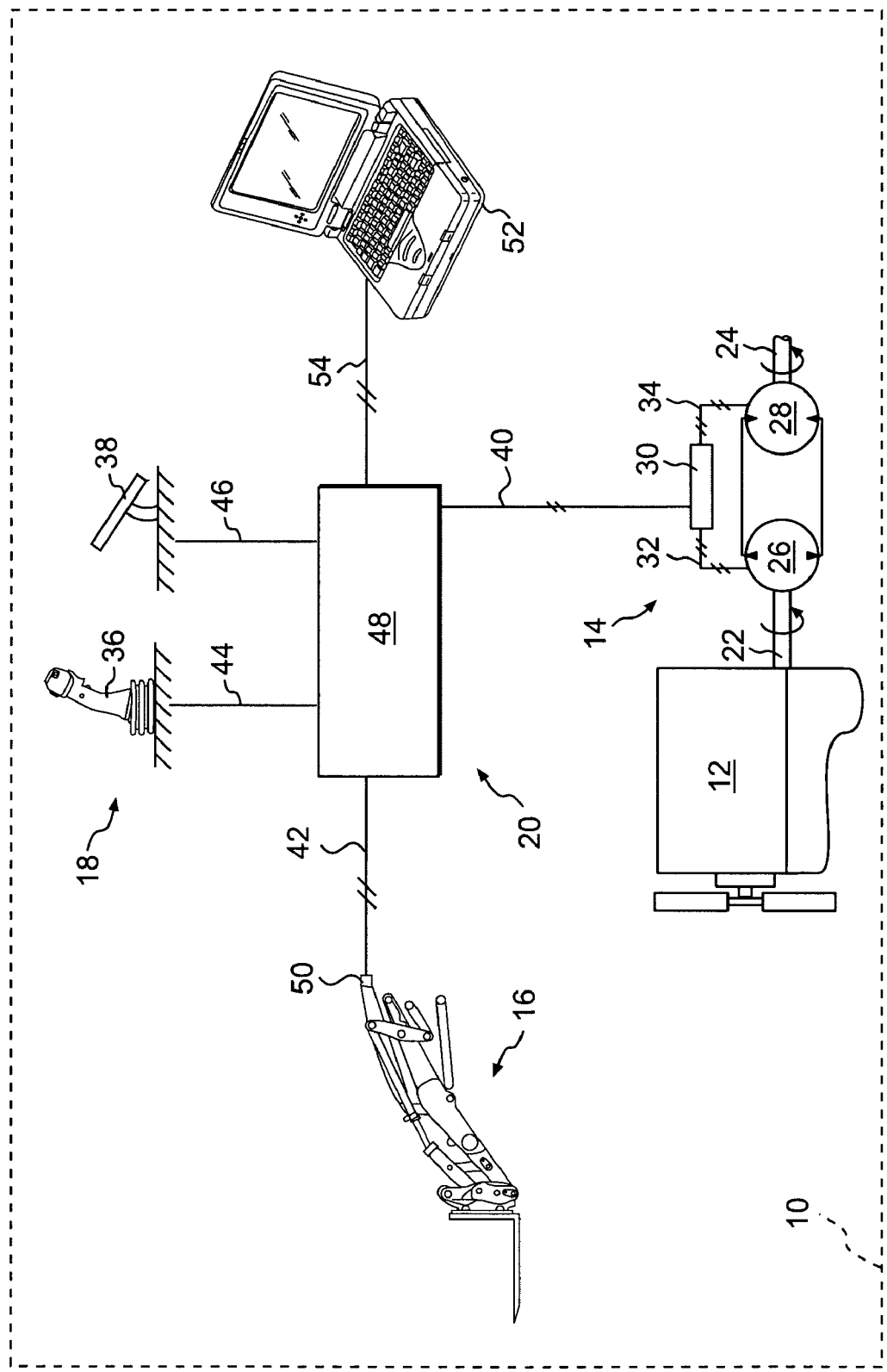
FIG. 1 is a diagrammatic illustration of an exemplary disclosed work machine control system.

FIG. 1 illustrates an exemplary work machine 10. Work machine 10 may be a fixed or mobile machine that performs some type of operation associated with an industry such as mining, construction, farming, or any other industry known in the art. For example, work machine 10 may be a material handler, a backhoe, an integrated tool carrier, a loader, or any other work machine known in the art. Work machine 10 may include a power source 12, a transmission 14, a work tool 16 removably attachable to work machine 10, an operator interface 18, and a control system 20.

Power source 12 may include an internal combustion engine such as, for example, a diesel engine, a gasoline engine, a natural gas engine, or any other engine apparent to one skilled in the art. Power source 12 may, alternately, include another source of power such as a furnace, a battery, a fuel cell, a motor, or any other appropriate source of power.

Transmission 14 may be configured to transmit power from power source 12 to an output device (not shown) at a range of output speed ratios. Transmission 14 may be a hydraulic transmission, a mechanical transmission, a hydro-mechanical transmission, an electric transmission, or any other suitable transmission. The output device may include a ground engaging device such as, for example, wheels, tracks, belts, or any other ground engaging device known in the art. An input drive member such as, for example, a countershaft 22, may connect power source 12 to transmission 14. Transmission 14 may also include an output driven member such as, for example, an output shaft 24 connecting transmission 14 to the output device. In this manner, power generated by power source 12 may be transmitted through output shaft 24 to the output device. It is contemplated that transmission 14 may alternately transmit power from power source 12 to the output device at only a single output speed ratio.

In one embodiment, transmission 14 may be a hydraulic transmission having a pump 26 and a motor 28. Pump 26 and motor 28 may be variable displacement, variable delivery, fixed displacement, or any other configuration known in the art. Pump 26 may be directly connected to power source 12 via countershaft 22. Alternately, pump 26 may be connected to power source 12 via a torque converter, a gear box, or in any other manner known in the art. Motor 28 may be fluidly connected to the pump 26 by conduits that supply and return fluid to and from the pump 26 and motor 28, allowing pump 26 to effectively drive motor 28 by fluid pressure. Motor 28 may be directly connected to the output device via output shaft 24. Work machine 10 may or may not include a reduction gear arrangement such as, for example, a planetary arrangement disposed between motor 28 and the output device.

Transmission controller 30 may be in communication with pump 26 and motor 28 via control lines 32 and 34, respectively, and configured to change displacements of pump 26 and/or motor 28 in response to a desired travel speed of work machine 10 to thereby control the output rotation of output shaft 24. Control lines 32 and 34 may be digital, analog, or mixed types of communication lines. Alternately, communication between with the various components of transmission 14 may be implemented by means of mechanical or hydraulic lines.

Numerous different work tools may be attachable to a single work machine and controllable via operator interface 18. Work tool 16 may include any device used to perform a particular task. For example, work tool 16 may include a fork arrangement, a blade, a bucket, a shovel, a ripper, a dump bed, a broom, a snow blower, a propelling device, a cutting device, a grasping device, or any other task-performing device known in the art. Work tool 16 may be connected to work machine 10 via a direct pivot, via a linkage system, via one or more hydraulic cylinders, or in any other appropriate manner. Work tool 16 may be configured to pivot, rotate, slide, swing, lift, or move relative to work machine 10 in any manner known in the art.

Operator interface 18 may be located within an operator cabin of work machine 10, in close proximity to a seat (not shown), and may include numerous devices to control the components, features, and functions of work machine 10. In one example, operator interface 18 may include a joystick controller 36 and a foot pedal 38. It is contemplated that operator interface 18 may include additional or different control devices such as, for example, levers, switches, buttons, pedals, wheels, and other control devices known in the art.

Joystick controller 36 may be configured to control a movement of work tool 16. In particular, joystick controller 36 may be tiltable about at least one axis and travel speed proportional. For example, joystick controller 36 may be tiltable in a forward position relative to a work machine operator to cause movement of work tool 16 in a first direction. Joystick controller 36 may also be tiltable in a rearward position relative to the work machine operator to cause movement of work tool 16 in a second direction opposite to the first direction. Joystick controller 36 may have a maximum and a minimum tilt angle limit in both the forward and rearward directions and may be tiltable to any angle between the maximum and minimum positions to move work tool 16 at a corresponding speed between a maximum and minimum travel speed in the associated direction. The ratio of the percent of maximum travel speed to the percent of maximum tilt angle of joystick controller 36 may be considered a work tool movement speed gain. It is contemplated that joystick controller 36 may be tiltable about multiple axis, twistable, and/or movable in any other manner. It is further contemplated that joystick controller 36 may be configured to control additional work machine functions other than movement of work tool 16. It is also contemplated that the movement of work tool 16 may be controlled by a control device other than joystick controller 36 such as, for example, a slide mechanism, a wheel mechanism, a pedal, or any other appropriate device.

Foot pedal 38 may be configured to control a travel speed and/or rimpull torque of work machine 10. In particular, a travel speed and/or rimpull torque of work machine 10 may be proportional to an actuation position of foot pedal 38. For example, foot pedal 38 may be pivotal in a first direction to indicate an increase in a desired travel speed and/or rimpull torque of work machine 10. Foot pedal 38 may also be pivotal in a second direction opposite the first direction to indicate a decrease in the desired travel speed and/or rimpull torque of work machine 10. Foot pedal 38 may have a maximum pivot limit in the first direction and a minimum pivot limit in the second direction and may be pivotal to any position between the maximum and minimum positions to set a desired travel speed and/or rimpull torque of work machine 10 at a corresponding speed between a maximum and minimum travel speed and/or rimpull torque. The ratio of a percent of maximum travel speed to a percent of maximum pivot angle of foot pedal 38 may be considered a work machine travel speed gain. The ratio of a percent of maximum rimpull torque to a percent of maximum pivot angle of foot pedal 38 may be considered a work machine rimpull torque gain. It is contemplated that the travel speed and/or rimpull torque of work machine 10 may be controlled by a control device other than foot pedal 38 such as for example, a slide mechanism, a wheel mechanism, a joystick, or any other appropriate device.

Control system 20 may be in communication with transmission controller 30 of transmission 14 via a communication line 40, with work tool 16 via a communication line 42, with joystick controller 36 via a communication line 44, and with foot pedal 38 via a communication line 46. Control lines 40–46 may be digital, analog, or mixed types of communication lines. Control system 20 may include a control module 48, a first tool recognition device 50, and a second tool recognition device 52.

Control module 48 may be a microprocessor that includes a means for storing and comparing information, and for controlling an operation of power source 12. Control module 48 may be embodied in a single microprocessor or multiple microprocessors. Numerous commercially available microprocessors can be configured to perform the functions of control module 48. It should be appreciated that control module 48 could readily be embodied in a general work machine microprocessor capable of controlling numerous work machine functions. Control module 48 may include any means for storing, comparing, and controlling such as a memory, one or more data storage devices, or any other components that may be used to run an application. Furthermore, although aspects of the present disclosure may be generally described as being stored in memory, one skilled in the art will appreciate that these aspects can be stored on or read from types of computer-related products or computer-readable media such as computer chips and secondary storage devices, including hard disks, floppy disks, optical media, CD-ROM, or other forms of RAM or ROM. Various other known circuits may be associated with control module 48, including power supply circuitry, signal-conditioning circuitry, solenoid driver circuitry, communication circuitry, and other appropriate circuitry.

Control module 48 may be configured to change an operation of work machine 10. In particular, control module 48 may change a work tool movement speed gain, a work machine travel speed gain, and/or a work machine rimpull gain. For example, when a first work tool 16 is attached to work machine 10, control module 48 may implement a first work tool movement speed gain, work machine travel speed gain, or work machine rimpull gain, and implement a second work tool movement speed gain, work machine travel speed gain, or work machine rimpull gain when a second work tool 16 is attached to work machine 10. It is contemplated that a third work tool movement speed gain, work machine travel speed gain, or work machine rimpull gain may be implemented when no work tool 16 is attached to work machine 10.

First tool recognition device 50 may be configured to automatically generate a signal indicative of which work tool 16 is attached to work machine 10 and to direct that signal to control module 48. Specifically, first tool recognition device 50 may be in communication via communication line 42 with control module 48. First tool recognition device 50 may include a scanning device such as, for example, an optical scanner, a laser scanner, a magnetic scanner or any other appropriate scanner that is configured to recognize a unique identification code associated with each work tool 16. The identification code, for the purposes of the present disclosure, may include a configuration of letters, numbers, symbols, pulses, voltage levels, bar codes or other indicia, signals, magnetic fields, sound or light waves, and other configurations that may represent a specific work tool. The identification code may take the form of either or both of human readable information and machine readable information.

The identification code may be attached to work tool 16 and located so as to be automatically read by first tool recognition device 50 when work tool 16 is attached to work machine 10. It is contemplated that the tool identification code could alternately be incorporated into a plug and socket arrangement, wherein a pin pattern may be unique to a specific work tool and serve to identify that particular work tool. It is further contemplated that other means for automatically identifying a particular work tool may be implemented such as, for example, a switch configured to receive an encoded key having magnetic information or a memory chip, an RF telemetry system, or any other means known in the art. It is also contemplated that first tool recognition device 50 may be omitted, if desired.

Control module 48 may alternately be configured to change an operation of work machine 10 in response to a signal from second tool recognition device 52. Specifically, second tool recognition device 52 may be in communication via a communication line 54 with control module 48. Control line 54 may be digital, analog, or a mixed type of communication line. Second tool recognition device 52 may include a means for manually entering the work tool identification code such as, for example, a keypad allowing the identification code to be manually entered by an operator. It is contemplated that other means for manually entering may alternately be implemented such as, for example, a data port allowing communication with a service tool having the identification code, an antenna allowing reception of the identification code from a remote location, a manually operated scanner configured to read an encoded indicia, or any other configuration that can receive the identification code. It is further contemplated that the specific work tool may be selected from an on-screen menu of a work machine display system. It is also contemplated that second tool recognition device 52 may be omitted, if desired.

Figure 2:
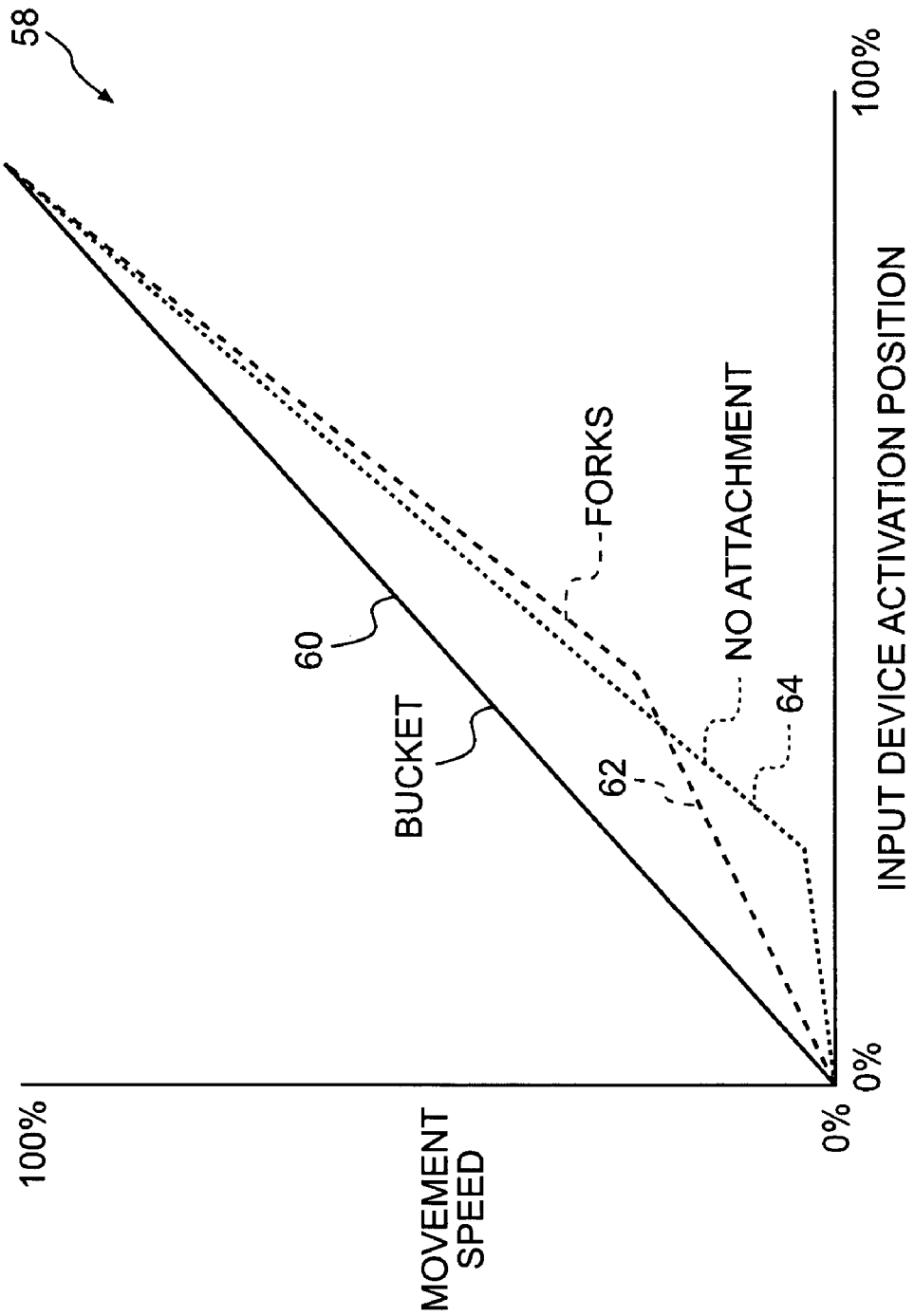
FIG. 2 is an exemplary disclosed work machine control table.

FIG. 2 illustrates an exemplary work machine gain control map 58. Gain control map 58 may include a first curve 60, a second curve 62, and a third curve 64. It is contemplated that a separate gain control map may be implemented for work machine travel speed gain control, work machine rimpull torque gain control, and/or for work tool movement speed gain control. Work machine gain control map 58 will be described in further detail in the following section.

INDUSTRIAL APPLICABILITY

The disclosed work machine control system finds potential application in any system where it is desirable to precisely control a work machine speed and/or torque gain based on a work tool attachment configuration. This control over work machine speed and/or torque gain may provide for increased operator movement efficiency, work machine and/or work tool placement accuracy, and work machine production.

Referring to FIG. 1, when control system 20 is in operation, the attachment of a particular work tool may be recognized automatically by first tool recognition device 50, which generates a signal unique to that work tool. Alternately, a work tool identification code corresponding to the particular work tool may be manually entered via second tool recognition device 52, which generates a signal unique to that work tool. The unique signal, either from first tool recognition device 50 or second tool recognition device 52, may then be directed to control module 48.

Control module 48 may receive the signal generated by either first tool recognition device 50 or second tool recognition device 52 and change a work machine travel speed gain, a work machine rimpull torque gain, and/or a work tool movement speed gain, which may result in a sensitivity change to operator input through joystick controller 36 and/or foot pedal 38. For example, a gain value of 1 means that when either joystick controller 36 or foot pedal 38 is actuated to a position of 50% of maximum, the speed of work tool movement, the speed of work machine travel, and/or the work machine rimpull torque will be 50% of a maximum. If the gain value is changed to be greater than 1 for a portion of the speed gain curve, actuating either joystick controller 36 or foot pedal 38 through 50% of its movement range may result in a speed and/or torque change greater than 50% of the speed and/or torque range. Similarly, if the gain value is changed to be less than 1, actuating either joystick controller 36 or foot pedal 38 through 50% of its movement range may result in a speed and/or torque change of less than 50% of the speed and/or torque range. In this manner, increasing a gain value may increase sensitivity of work tool 16 or work machine 10 to operator input through either joystick controller 36 or foot pedal 38. Increased sensitivity may provide for a work machine that is very responsive, while requiring little operator movement. Decreasing a gain value may decrease sensitivity of work tool 16 or work machine 10 to operator input through either joystick controller 36 or foot pedal 38. Decreased sensitivity of work tool movement or work machine travel to operator input may allow for more precise placement of work tool 16 or work machine 10.

As illustrated in FIG. 2, a first work tool such as, for example, a bucket, may benefit most from a linear work machine gain curve 60 having a large gain ratio. The linearity of gain curve 60 may provide a constant amount of work tool movement speed change per joystick actuation angle change and/or a constant amount of work machine travel speed or rimpull torque change per pedal pivot angle change. The steepness, or gain ratio of 1, may allow for a greater change in movement speed, travel speed, or rimpull torque per actuation or pivot angle change, thereby resulting in a work machine 10 or work tool that is sensitive and responsive to operator input. As described above, different maps may be employed for work machine speed and/or torque gain and for work tool speed gain.

When operating a work machine having a work tool 16 used in procedures benefiting from precise work tool or work machine placement such as, for example, a fork attachment used for a stacking procedure, a work machine that is somewhat less sensitive to operator input may be desired. A second gain curve 62 having a gain ratio of less than one may have decreased sensitivity when compared to gain curve 60, which may allow the operator to actuate joystick controller 36 and/or foot pedal 38 with a decreased amount of speed or torque change of the associated work tool 16 or work machine 10. This decreased sensitivity may be applied along an entire gain curve or limited to within a predetermined range of motion of joystick controller 36 and foot pedal 38. The non-linearity of second curve 62 may allow for precise placement of work machine 10 and/or work tool 16 when required and for increased sensitivity of work machine 10 and/or work tool 16 when not required.

As a further example, a work machine 10 having no work tool 16 attached may be operated in one of several modes, including a between job site travel mode and a work tool attaching mode. When operating in the between job site travel mode, increased sensitivity may be beneficial in allowing a greater work machine travel speed and/or torque change per pedal pivot angle change. While operating during the work tool attaching mode, however, less sensitive controls may allow for more precise alignment between work machine 10 and work tool 16.

Several advantages are realized because the work machine travel speed and/or torque gain and work tool movement speed gain may be modified in response to a work tool attachment configuration and because the work machine travel speed and/or torque gain and work tool movement speed gain may be modified automatically. Although work machine travel speed and/or torque and work tool movement speed may continue to operate between the same maximum and minimum speeds, the ability to change the sensitivity of the control during particular actuation ranges of joystick controller 36 and foot pedal 38 may provide an increased level of control over work machine and/or work tool placement. In addition, because the work machine travel speed and/or torque gain and work tool movement gain are associated with particular work tools, operations of these work tools and work machine 10 when the work tools are attached, may be optimized to improve both operator movement efficiency and production of work machine 10. Further, because the gains may be automatically adjusted according to work tool attachment configuration, the operation and configuration of work machine 10 may be simplified.

It will be apparent to those skilled in the art that various modifications and variations can be made to the control system of the present disclosure. Other embodiments of the control system will be apparent to those skilled in the art from consideration of the specification and practice of the invention disclosed herein. It is intended that the specification and examples be considered as exemplary only, with a true scope of the invention being indicated by the following claims and their equivalents.

What is claimed is:

1. A control system for a work machine having a plurality of removably attachable work tools, the control system comprising:

at least one operator input device configured to control a movement speed of the work machine;

a tool recognition device configured to generate a signal corresponding to each of the removably attachable work tools; and a controller in communication with the at least one input device and the tool recognition device, the controller being configured to change a ratio of a work machine movement speed to actuation position of the input device in response to the signal.

2. The control system of claim 1, wherein the movement speed is a movement speed of the at least one work tool.

3. The control system of claim 1, wherein the movement speed is a travel speed of the work machine.

4. The control system of claim 1, wherein the tool recognition device includes a scanner disposed on the work machine and configured to automatically recognize which of the plurality of removably attachable work tools are attached to the work machine and to generate the signal in response to the recognition.

5. The control system of claim 1, wherein the tool recognition device includes a manual input mechanism configured to receive a manual input corresponding to which of the plurality of removably attachable work tools are attached to the work machine and to generate the signal in response to the input.

6. The control system of claim 1, wherein the controller includes a memory having a table stored therein, the table having a ratio for a plurality of actuation positions of the input device.

7. The control system of claim 6, wherein the table includes multiple ratios for each of the plurality of actuation positions of the input device, each ratio for a given actuation position corresponding to a different one of the plurality of removably attachable work machine tools.

8. The control system of claim 1, wherein the signal is unique for each of the plurality of removably attachable work tools.

9. A method of controlling a work machine having a plurality of removably attachable work tools, the method comprising:

receiving an input from an input device indicative of a desired movement speed of the work machine;

generating a signal with a tool recognition device indicative of which one of the plurality of removably attachable work tools is attached to the work machine; and changing a ratio of a work machine movement speed to actuation position of the input device in response to the signal.

10. The method of claim 9, wherein the movement speed is a movement speed of the at least one work tool.

11. The method of claim 9, wherein the movement speed is a travel speed of the work machine.

12. The method of claim 9, further including automatically recognizing which of the plurality of removably attached work tools are attached to the work machine with the tool recognition device.

13. The method of claim 9, further including receiving a manual input corresponding to which of the plurality of removably attachable work tools are attached to the work machine.

14. The method of claim 9, further including referencing a table stored in a memory of work machine controller to determine the ratio for an actuation position of the input device.

15. The method of claim 14, wherein the table includes multiple ratios for a plurality of actuation positions of the input device, each ratio for a given actuation position corresponding to a different one of the plurality of removably attachable work machine tools.

16. The method of claim 9, further including generating a different signal for each of the plurality of removably attachable work tools.

17. A work machine, comprising:
a plurality of removably attachable work tools;
a control system having:
at least one operator input device configured to control a movement speed of the work machine;
a tool recognition device configured to generate a signal corresponding to each of the removably attachable work tools; and
a controller in communication with the at least one input device and the tool recognition device, the controller being configured to change a ratio of a work machine movement speed to actuation position of the input device in response to the signal.

18. The work machine of claim 17, wherein the movement speed is a movement speed of the at least one work tool.

19. The work machine of claim 17, wherein the movement speed is a travel speed of the work machine.

20. The work machine of claim 17, wherein the tool recognition device includes a scanner disposed on the work machine and configured to automatically recognize which of the plurality of removably attachable work tools are attached to the work machine and to generate the signal in response to the recognition.

21. The work machine of claim 17, wherein the tool recognition device includes a manual input mechanism configured to receive a manual input corresponding to which of the plurality of removably attachable work tools are attached to the work machine and to generate the signal in response to the input.

22. The work machine of claim 17, wherein the controller includes a memory having a table stored thereon, the table having a ratio for a plurality of actuation positions of the input device.

23. The work machine of claim 22, wherein the table includes multiple ratios for each of the plurality of actuation positions of the input device, each ratio for a given actuation position corresponding to a different one of the plurality of removably attachable work machine tools.

24. The work machine of claim 17, wherein the signal is unique for each of the plurality of removably attachable work tools.

25. A control system for a work machine having a plurality of removably attachable work tools, the control system comprising:
at least one operator input device configured to control a rimpull torque of the work machine;
a tool recognition device configured to generate a signal corresponding to each of the removably attachable work tools; and
a controller in communication with the at least one input device and the tool recognition device, the controller being configured to change a ratio of a work machine rimpull torque to actuation position of the input device in response to the signal.

26. The control system of claim 25, wherein the tool recognition device includes a scanner disposed on the work machine and configured to automatically recognize which of the plurality of removably attachable work tools are attached to the work machine and to generate the signal in response to the recognition.

27. The control system of claim 25, wherein the tool recognition device includes a manual input mechanism configured to receive a manual input corresponding to which of the plurality of removably attachable work tools are attached to the work machine and to generate the signal in response to the input.

28. The control system of claim 25, wherein the controller includes a memory having a table stored therein, the table having a ratio for a plurality of actuation positions of the input device.

29. The control system of claim 28, wherein the table includes multiple ratios for each of the plurality of actuation positions of the input device, each ratio for a given actuation position corresponding to a different one of the plurality of removably attachable work machine tools.

30. The control system of claim 25, wherein the signal is unique for each of the plurality of removably attachable work tools.

31. A method of controlling a work machine having a plurality of removably attachable work tools, the method comprising:
receiving an input from an input device indicative of a desired rimpull torque of the work machine;
generating a signal with a tool recognition device indicative of which one of the plurality of removably attachable work tools is attached to the work machine; and
changing a ratio of a work machine rimpull torque to actuation position of the input device in response to the signal.

32. The method of claim 31, further including automatically recognizing which of the plurality of removably attached work tools are attached to the work machine with the tool recognition device.

33. The method of claim 31, further including receiving a manual input corresponding to which of the plurality of removably attachable work tools are attached to the work machine.

34. The method of claim 31, further including referencing a table stored in a memory of work machine controller to determine the ratio for an actuation position of the input device.

35. The method of claim 34, wherein the table includes multiple ratios for a plurality of actuation positions of the input device, each ratio for a given actuation position corresponding to a different one of the plurality of removably attachable work machine tools.

36. A work machine, comprising:
a plurality of removably attachable work tools;
a control system having:
at least one operator input device configured to control a rimpull torque of the work machine;
a tool recognition device configured to generate a signal corresponding to each of the removably attachable work tools; and
a controller in communication with the at least one input device and the tool recognition device, the controller being configured to change a ratio of a work machine rimpull torque to actuation position of the input device in response to the signal.

37. The work machine of claim 36, wherein the tool recognition device includes a scanner disposed on the work machine and configured to automatically recognize which of the plurality of removably attachable work tools are attached to the work machine and to generate the signal in response to the recognition.

* * * * *